July 14, 1964

W. B. REUKAUF 3,140,970

APPARATUS FOR WINDING FOIL ABOUT A RIGID ROD

Filed Feb. 17, 1961

INVENTOR.
WILLIAM B. REUKAUF

BY Howson & Howson

ATTYS.

July 14, 1964 W. B. REUKAUF 3,140,970
APPARATUS FOR WINDING FOIL ABOUT A RIGID ROD
Filed Feb. 17, 1961 4 Sheets—Sheet 2

INVENTOR:
WILLIAM B. REUKAUF
BY
Howson & Howson
ATTYS.

July 14, 1964 W. B. REUKAUF 3,140,970
APPARATUS FOR WINDING FOIL ABOUT A RIGID ROD
Filed Feb. 17, 1961 4 Sheets-Sheet 3
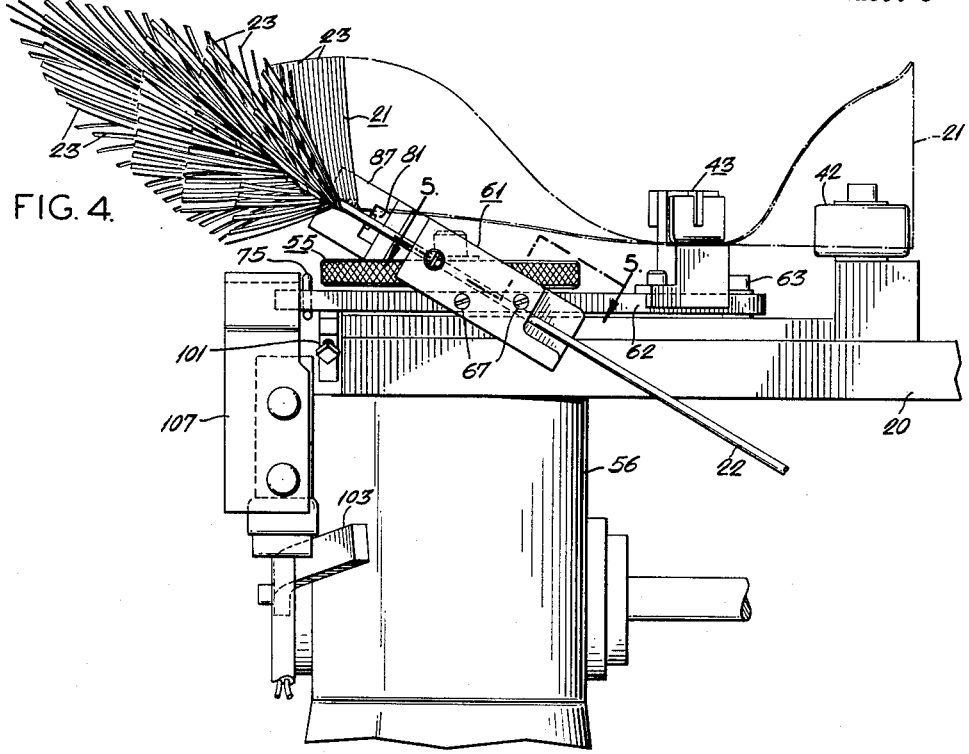
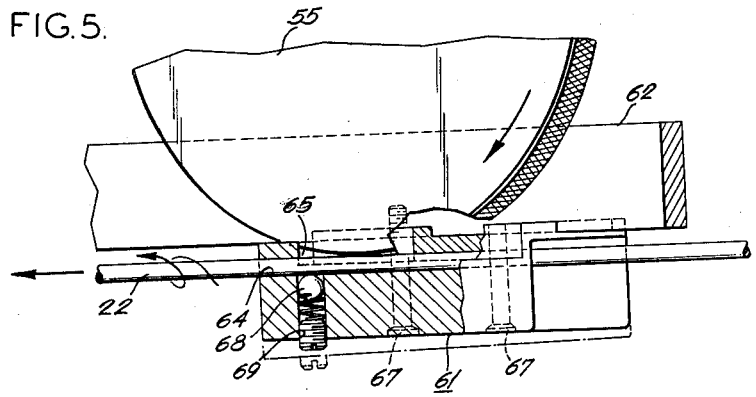
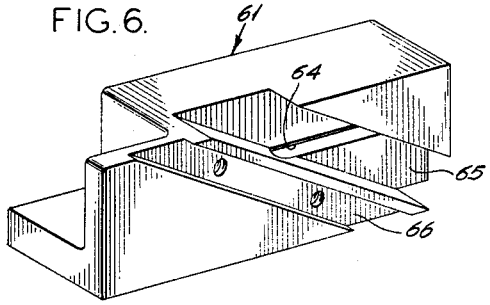
INVENTOR:
WILLIAM B. REUKAUF
BY
Howson & Howson
ATTYS July 14, 1964 W. B. REUKAUF 3,140,970
APPARATUS FOR WINDING FOIL ABOUT A RIGID ROD
Filed Feb. 17, 1961 4 Sheets-Sheet 4
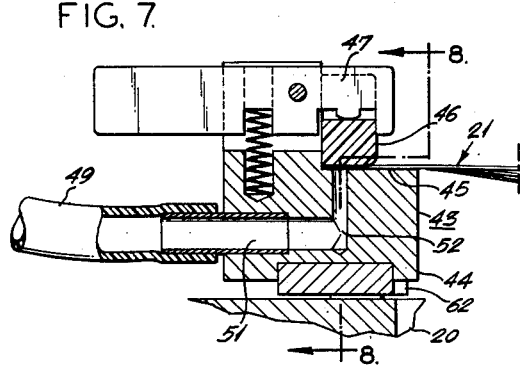
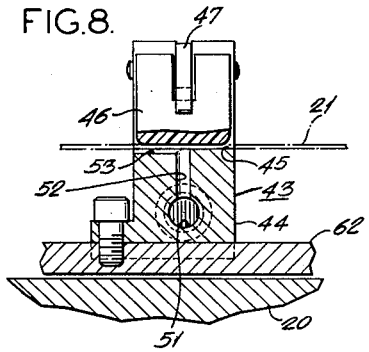
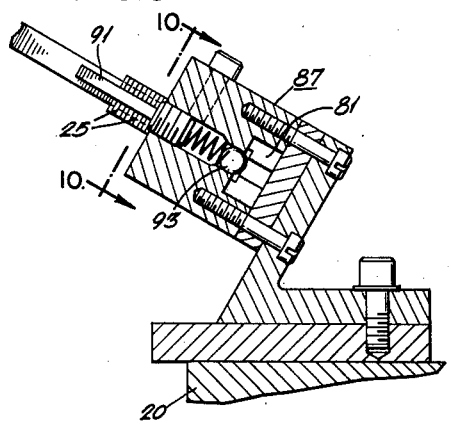
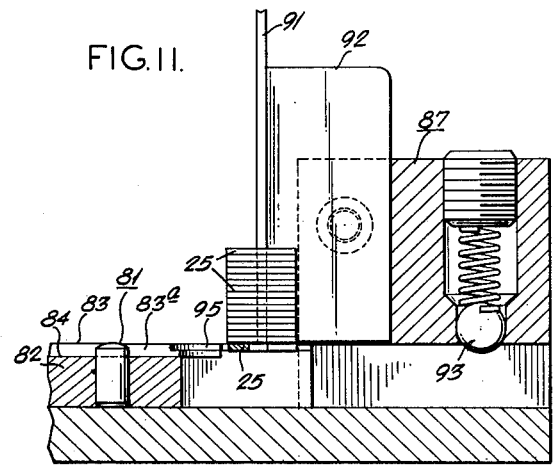
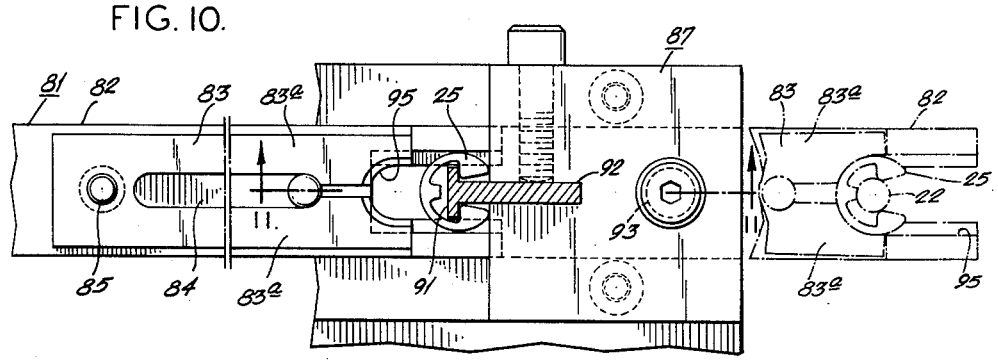
INVENTOR:
WILLIAM B. REUKAUF
BY
Howson & Howson
ATTYS.

United States Patent Office 3,140,970
Patented July 14, 1964

3,140,970
APPARATUS FOR WINDING FOIL ABOUT A RIGID ROD
William B. Reukauf, Haddonfield, N.J., assignor to Carey-McFall Company, Philadelphia, Pa., a corporation of Pennsylvania
Filed Feb. 17, 1961, Ser. No. 90,130
12 Claims. (Cl. 156—447)

The present invention relates to new and useful improvements in winding machines and more particularly to new and useful improvements in apparatus for winding foil about rods to form imitation Christmas tree branches and the like.

Prior to the present invention imitation Christmas tree branches were wound by hand with a skilled worker being able to produce in the neighborhood of 700 to 1000 branches per day. In the hand-winding operation, the operator would apply dots of adhesive to the branch rod, secure the leading edge of the foil to the upper end of the branch rod and then rotate the rod with one hand guiding the foil along the rod with the other hand so that the foil forms a helix about the branch rod. With this construction there was no uniformity in branches as the pitch of the helix would vary from branch to branch and also vary along the length of the branch. Also, the foil was not tightly wrapped about the branch but could slip relative to the branch at points where it was not secured to the branch rod.

With the machine of the present invention an operator with an average amount of experience can easily produce 4000 branches during an eight hour day, thereby considerably decreasing the labor costs for the manufacturer of branches of this type. Further, the branches are always uniform, and as the tension on the foil may be controlled, the foil may be wrapped more tightly about the rod to form a more permanent branch construction.

With the foregoing in mind, a primary object of the present invention is to provide apparatus for automatically winding foil or the like about a rigid rod to form an imitation Christmas tree branch or the like.

Another object of the present invention is to provide a novel branch winding machine which will permit artificial tree branches of this type to be made more quickly and more uniformly with the foil being firmly secured to the branch rod under a uniform predetermined tension.

A further object of the present invention is to provide apparatus of the above set forth type which will automatically wind foil about a rod of any length and stop winding foil about the rod a predetermined distance from the base end of the rod.

Still a further object of the present invention is to provide apparatus for automatically winding foil about a rod which will automatically secure the foil to the base of the rod at the end of the winding operation.

A still further object of the present invention is to provide simplified apparatus of the above described type which is of relatively simplified construction, may be manufactured easily and cheaply, may be easily operated by unskilled labor, and which is entirely efficient and effective in operation and use.

These and other objects of the present invention and the various features and details of the operation and construction thereof are hereinafter more fully set forth and described with reference to the accompanying drawings, in which:

FIG. 4 is an enlarged fragmentary front view of the means for supporting and advancing a branch rod;

FIG. 5 is an enlarged fragmentary sectional view taken on line 5—5, FIG. 4;

FIG. 6 is a perspective view of the branch rod guide member;

FIG. 7 is an enlarged fragmentary sectional view of the means for applying adhesive to the lower surface of the foil prior to the foil being wrapped about the branch rod;

FIG. 8 is a fragmentary sectional view taken on line 8—8, FIG. 7;

FIG. 9 is an enlarged fragmentary sectional view taken on line 9—9, FIG. 3, illustrating the means for applying clips to the base end of the branch rod after the foil is wrapped about the rod;

FIG. 10 is a fragmentary sectional view taken on line 10—10, FIG. 9;

FIG. 11 is a fragmentary sectional view taken on line 11—11, FIG. 10;

Figure 1:
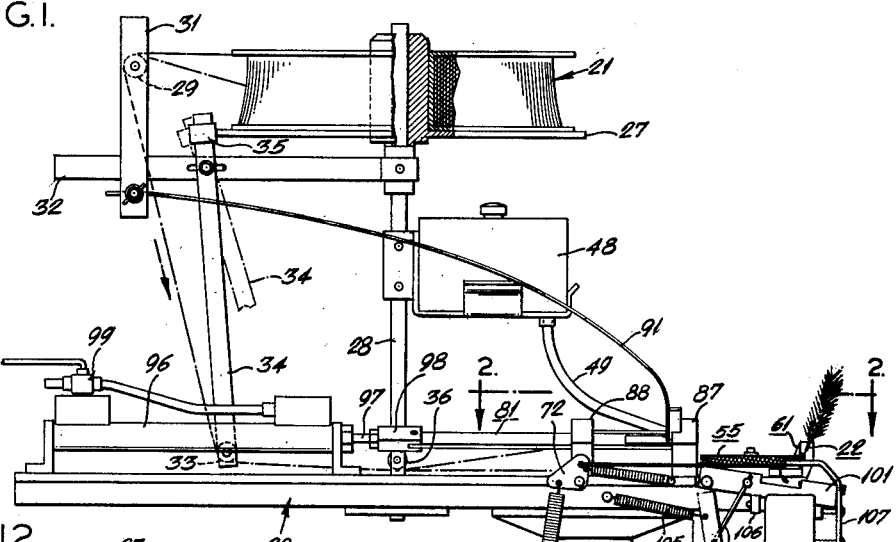
FIG. 1 is a side elevational view partially in section of a branch winding machine made in accordance with the present invention.
Figure 12:
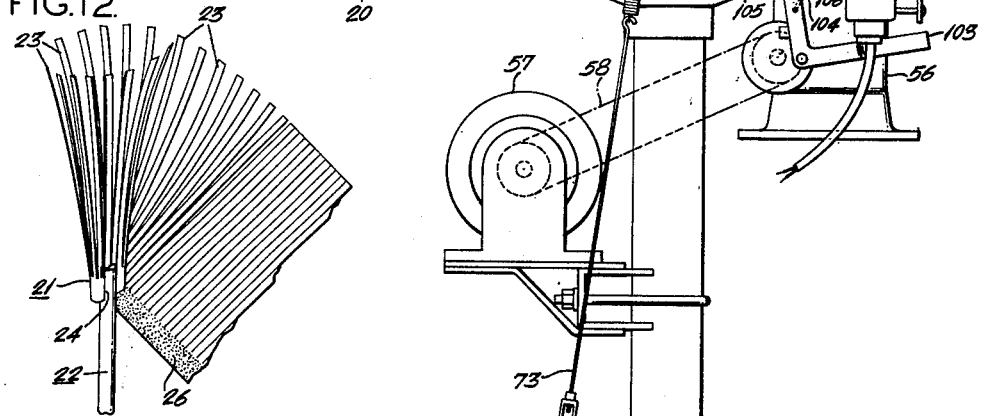
FIG. 12 is a fragmentary perspective view illustrating the upper end of a branch rod with the foil in position on the rod at the beginning of a winding operation.
Figure 13:
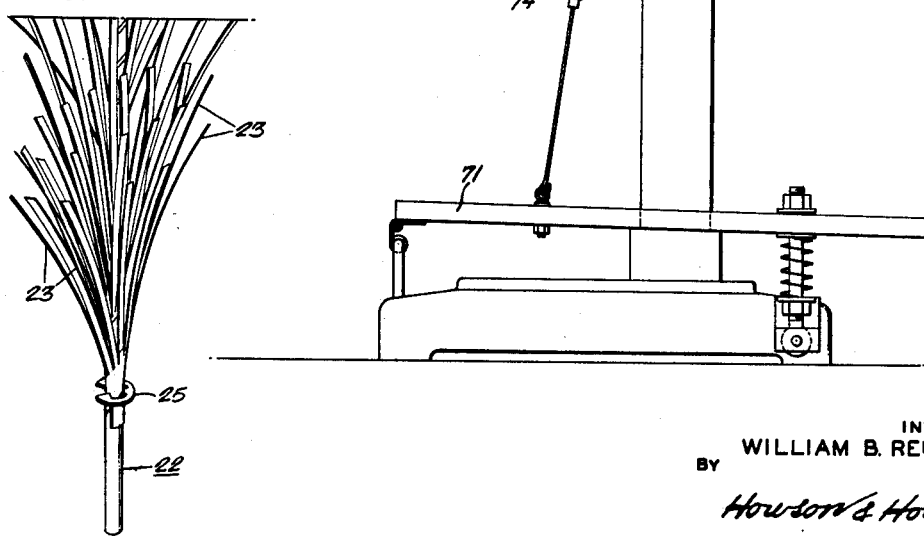
FIG. 13 is a perspective view of the lower end of a completed branch rod.

Referring more specifically to the drawings and particularly FIG. 1, there is illustrated therein a pedestal supported table or frame 20 which mounts foil feed means for feeding foil 21 under predetermined tension and drive means for simultaneously advancing and rotating a branch rod 22 about which the foil 21 is wrapped. The foil 21 preferably is in the form of a continuous strip of material, such as sheet aluminum, with one edge thereof uninterrupted and the other edge being cut transversely to form a plurality of foil fingers 23. The rods 22 about which the foil is wrapped are preferably formed of metal but may be made of any suitable material. Fastening means are provided at the forward or upper end of the rod to permit the foil to be initially secured to the branch rod. In the illustrated embodiment of the present invention a slot 24 is provided at the upper end of the rod within which the leading edge of the foil 21 may be inserted to secure the foil 21 to the upper end of the rod. After the foil is secured to the upper end of the rod, the rod is advanced longitudinally and rotated thereby wrapping the foil spirally about the rod causing the foil fingers 23 to extend outwardly from the rod thereby forming an imitation Christmas tree branch. At the end of the wrapping operation a metal clip or the like 25 is secured to the lower end of the branch rod in engagement with the lower end of the foil thereby permanently fixing the foil to the rod. If desired, a strip of glue or adhesive 26 may be applied along the uninterrupted edge of the foil as illustrated in FIG. 12 to adhesively secure the foil to the rod.

The foil 21 is supported in roll form on a rotatable stand 27 rotatably mounted on an upright shaft 28 secured to the table 20. A 90° twist is made in the foil as it is pulled off of the stand by passing the foil over a roller 29 carried by a stationary support arm 31 which in turn is fixed to a stationary bracket 32 secured to the vertical shaft 28. The foil then passes downwardly to a point adjacent the top of the table 20 and is passed about a brake actuating roll 33 carried by a pivotal brake arm 34 which is pivoted to the support bracket 32 and has a friction brake member 35 secured to its upper end adapted to engage the peripheral edge of the rotatable stand 27 to stop rotation of the same. While the foil 21 is being pulled off of the stand, for example, by the operator or by being wrapped around a branch rod, the tension in the foil pulls the brake actuating roller 33 and the brake arm 34 to the right with respect to FIG. 1 thereby pivoting the brake arm 34 to the position as shown in dotted lines in FIG. 1 removing the friction member 35 from engagement with the peripheral edge of the rotatable stand 27 permitting the stand to rotate freely. As soon as tension in the foil 21 is released the brake arm 34 will swing downwardly by its own weight to the position as shown in full lines in FIG. 1, assuming a nearly vertical position, with the friction member 35 engaging the peripheral edge of the rotatable stand 27 to prevent rotation of the same.

Figure 2:
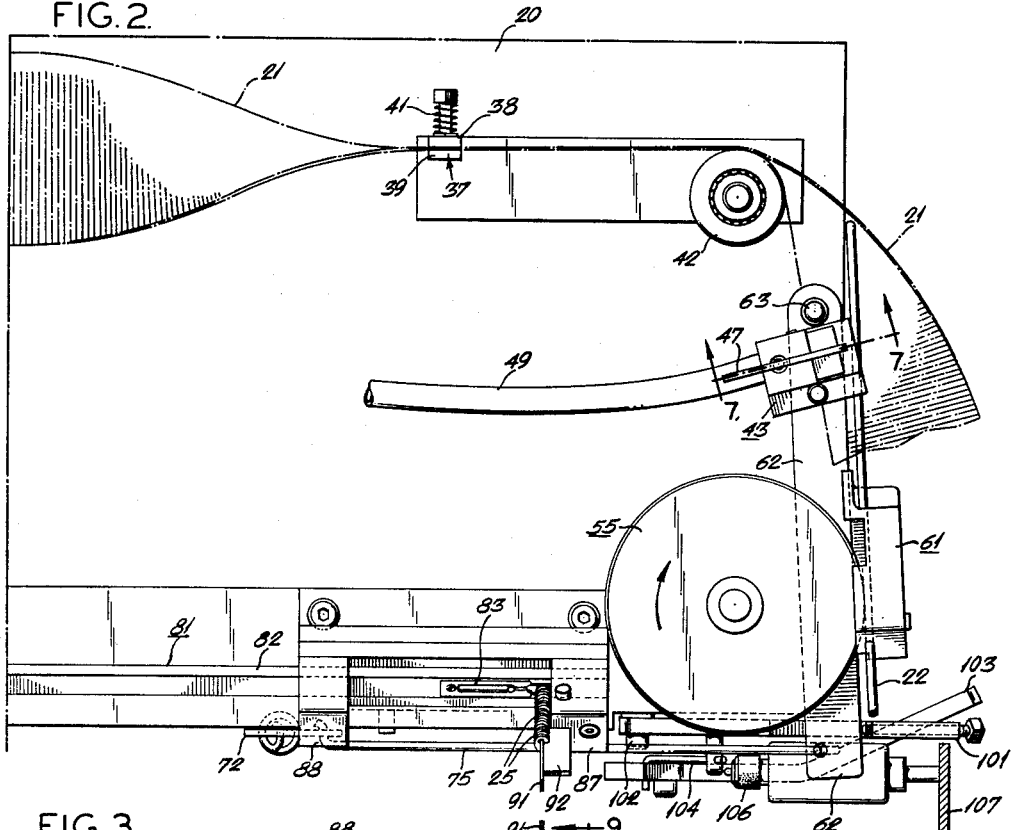
FIG. 2 is a fragmentary plan view taken on line 2—2, FIG. 1, illustrating the means for causing rotation and advancement of the branch rod.

After the foil leaves the brake actuating roller 33, it is passed under a guide roll 36 mounted adjacent the top of the table 20 and is then turned vertically with its uninterrupted edge down and the foil fingers 23 extending upward. Thereafter, the foil is pulled through a tension control unit 37, formed as illustrated in FIG. 2 with a pair of oppositely disposed blocks 38 and 39 mounted adjacent one another adapted to engage opposite sides of the foil. An adjustable compression spring 41 is provided to adjust the pressure between the blocks 38 and 39 and exert the desired tension on the foil. Thereafter, the foil leaves the tension control unit 37 and passes about a guide roll 42 and is again turned to lie in a horizontal plane.

Before the foil is brought to the rod feeding station where the foil is wrapped about the rod it is caused to pass through an adhesive applicator 43 formed as illustrated in FIGS. 2, 7, and 8 of the drawings. The adhesive applicator 43 comprises a lower metering block 44 having an upper adhesive applicator face 45 lying in a horizontal plane over which the foil 21 passes and an upper pressure block 46 which is forced downwardly against the upper surface of the foil 21 by means of a spring-biased arm 47 to hold the foil 21 against the adhesive applicating face 45 of the block 44. Adhesive is fed to the applicator block 44 from an adhesive supply tank 48 which may be adjustably mounted on the vertical shaft 28. The adhesive passes through a flexible tube 49 which terminates in fluid communication with a chamber 51 within the adhesive applicator block 44. A small opening 52 provides communication between the chamber 51 and an adhesive applying slot or groove 53 at the trailing edge of the adhesive applicating face 45 of the block 44. With this construction, a predetermined amount of adhesive is supplied to the groove 53 and transferred to one side of the uninterrupted edge of the foil 21 as the foil passes over the adhesive applicator face 45 and above the groove 53.

At the rod feeding station the leading edge of the foil is initially secured to the forward or upper end of the rods, for example, as set forth previously with initial portion of the uninterrupted edge of the foil being inserted into a slot 24 in the leading edge of the rod 22. Thereafter, the rod is caused to be rotated and advanced to wrap the foil about the rod.

An important feature of the present invention is the provision of means for simultaneously advancing and rotating the rod after the foil is secured to the leading end of the rod, to cause the foil to be wrapped spirally and uniformly about the rod. In the illustrated embodiment of the present invention this is accomplished by forcing the rod against the peripheral edge of a continuously rotating knurled wheel 55 with the rod positioned at an angle relative to the axis of the wheel. By varying the angle of the rod relative to the axis of the wheel, the speed of advance of the rod may be varied and the pitch of the foil or the number of turns of the foil about the rod in each inch may be varied, thereby permitting control over the amount of foil applied to a rod and controlling the appearance of fullness of the branch. It has been found that if the knurled wheel is positioned in a horizontal plane and the rod is positioned in a plane at approximately 30° to the horizontal, a branch having an ideal appearance will be obtained.

In accordance with the present invention, the knurled wheel is rotated constantly at a uniform rate of speed and means are provided to maintain a branch rod in the desired angular relation relative to the axis of the knurled wheel and move the rod into and out of engagement with the wheel. It will be understood, however, that a stationary guide may be provided for the branch rod with the wheel arranged to move into and out of engagement with the rod. In the embodiment of the invention illustrated in the drawing, the knurled wheel is mounted on a drive shaft extending upwardly through the table 20 from a speed reducer 56. A motor 57 supported, for example, from the stand of the table is provided to drive the speed reducer 56 with any suitable drive means, such as, for example, a chain drive 58 interconnecting the drive shaft of the motor with the driven shaft of the speed reducer. With a wheel such as that illustrated in the drawings, applicant has found that 50 to 100 revolutions per minute is a suitable speed of rotation of the wheel 55 in order to properly wind the foil about the branch rod and produce artificial branches at a suitable rate of speed.

It is important in the making of the artificial branches of this type that the rod be firmly guided into engagement with the wheel as the rods will be rotated in the neighborhood of 1000 to 1500 revolutions per minute, and will be advanced at a rapid rate of speed. Additionally, the operator must be able to selectively cause the rod to engage the wheel and after the foil is wrapped about the rod for the desired length of the rod the rod should remain firmly held while the clip 25 is attached to the rod. This is accomplished in the present embodiment of the invention by means of guide block 61 rigidly mounted on a pivotal arm 62 with the arm being pivoted at the rear end thereof to the top of the table 20, for example, by means of a pin as indicated at 63.

The guide block 61 is best illustrated in FIGS. 4, 5, and 6 of the drawings and has a central opening 64 extending longitudinally therethrough through which the rod passes. A groove 65 extends angularly across one face of the guide block 61 at a predetermined angle relative to the axis of the guide block. The groove 65 extends into the guide block to a plane bisecting the central longitudinal opening 64 and the knurled wheel 55 is adapted to be received in the groove 65 and engage that portion of the branch rod 22 which is exposed to the knurled wheel at the groove 65. A second shallow groove 66 may also be provided in the rear face of the guide block for the purpose of receiving the pivotal arm 62 on which the guide block is mounted with bolts 67 adapted to extend through the guide block into the pivotal arm 62 to secure the guide block to the arm. A spring-biased ball 68 is positioned in a recess 69 in the guide block 61 with the ball maintained adjacent the central opening 64 and adapted to engage a guide rod positioned in the guide block. The ball 68 is positioned adjacent the forward end of the guide block with respect to the direction of travel of the rod, as illustrated in FIG. 5 and engages the rod at a point after the rod becomes disengaged from the knurled wheel 55. With this, when the operator initially places a rod 22 in the guide block opening the spring-biased ball 68 will maintain the rod in the opening and prevent it from slipping out. Further, as the rod becomes disengaged from the wheel 55 the spring-biased ball will exert a braking effect on the rod 22 maintaining the rod in position in the guide block until manually removed therefrom by the operator of the machine.

Figure 3:
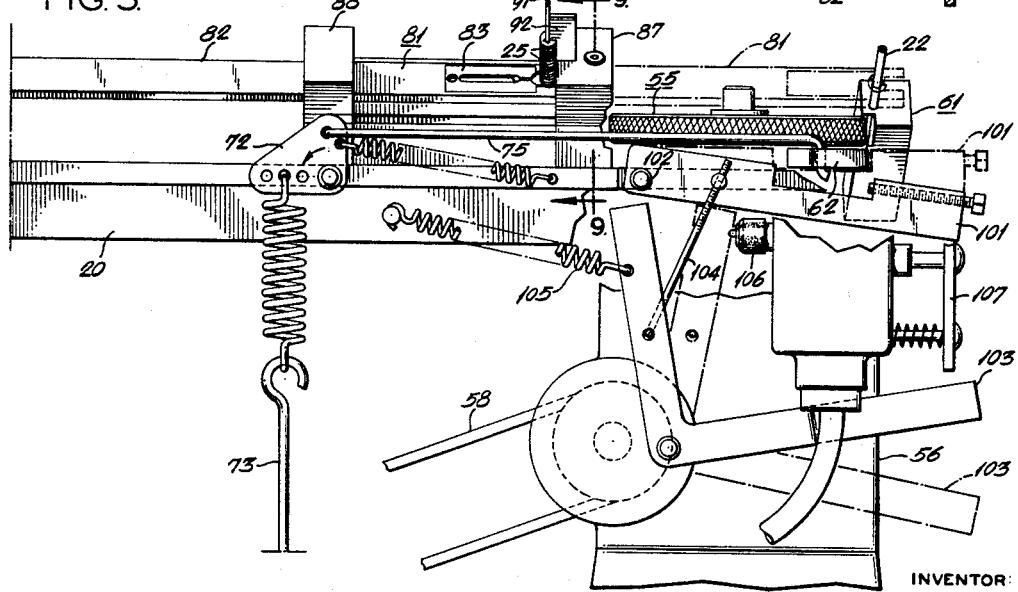
FIG. 3 is a side elevational view of that portion of the machine illustrated in FIG. 2 with certain elements of the machine broken away.

An operating foot treadle 71 is provided at the base of the branch winding machine which may be pushed downwardly by the operator to force the rod 22 positioned within the guide block into engagement with the knurled wheel. With reference to FIGS. 1 and 3, the foot treadle is interconnected with a pivoted bell crank 72 mounted adjacent the side of the table 20 with the connection between a foot treadle and the bell crank preferably including an adjustable link 73 having a turnbuckle or the like 74 therein to permit adjustment of the length of the link. The bell crank in turn is interconnected with the pivoted arm 62 by means of a connecting link 75 which has one end thereof received in an opening in the bell crank and the other end thereof secured in an opening in the forward end of the pivoted arm 62. With this construction when the operator of the machine presses the food treadle downwardly the bell crank is pivoted in the counterclockwise direction with respect to FIGS. 1 and 3 pulling the pivotal arm 62 inwardly toward the table 20 and causing the rod 22 carried by the guide block 61 to engage the continuously rotating knurled wheel 55. Upon engagement of the rod 22 by the knurled wheel 55 the rod is simultaneously rotated and advanced.

Prior to actuation of the foot treadle the operator of the machine will insert the leading edge of the foil 21 into the slot 24 at the top of the rod 22 and rotate the rod one or two revolutions to secure the foil to the rod. Thereafter the operator will press foot treadle downwardly pulling the rod 22 into engagement with the rotating knurled wheel 55. Because of the angular relation between the axis of the rod 22 and the axis of the wheel 55, the rod will simultaneously be advanced and rotated causing the foil to be wrapped spirally about the rod.

As the rod becomes disengaged from the wheel by being advanced to the forward end of the guide block, the spring-biased ball 68 will engage the rear end of the rod and maintain the rod in position in the guide block until the rod is manually removed from the guide block by the operator, for example, by pushing a second branch rod through the central opening in the guide block.

In accordance with the present invention after the foil has been wrapped about the branch rod the clip 25 is secured to the branch rod about the trailing end of the foil to secure the foil to the branch rod. In the illustrated embodiment of the present invention the clip is secured to the branch rod by means of a reciprocating clip applicator assembly, designated generally at 81 which is mounted on top of the table 20 as illustrated in FIGS. 1, 2, and 3. The clip applicator 81 comprises an applicator bar 82 of generally rectangular cross-sectional shape having a clip holder 83 secured to the forward end thereof overlying a shallow groove 84 in the extreme forward end of the bar 82. The clip holder is recessed in the front end of the applicator bar 82 so that its upper edge is flush with the upper surface of the applicator rod 82 and is secured to the forward end of the applicator rod, for example, by means of a bolt 85 projecting upwardly through the applicator rod and threadly received in the rear end of the clip holder 83. The forward end of the clip holder 83 is bifurcated forming a pair of resilient spring fingers 83a, 83a which grip opposite sides of the clip 25, for example, as illustrated in FIG. 10 and maintain the clip in position while it is fastened about the rod 22.

The clip applicator assembly 81 is guided in its forward and rearward movement by means of a pair of front and rear housing blocks 87 and 88, respectively, which have rectangular guide openings extending therethrough with which the clip applicator assembly is received. The clips are fed in the desired position to the rear surface of the forward housing block 87 by means of a rectangular feed rod 91 which has its upper end removably secured, for example, to the stationary support arm 31 and its lower end secured to a guide bar 92 projecting upwardly from the front housing block 87 as shown in FIGS. 1 and 3. The clips 25 are placed on the feed rod with their open ends facing in a direction toward the branch rod 22 and drop downwardly by gravity to a position as shown in FIGS. 10 and 11 immediately above the forward end of the clip holder 83.

Upon advancement of the clip applicator assembly 81 the lowermost clip on the rod 91 is engaged between the fingers 83a of the clip holder 83 and forced forwardly thereby into the front housing block 87. Upon advancement of the clip through the front housing block 87 the clip 25 engages a spring-biased detent ball 93 which forces the clip rearwardly into the clip receiving recess 95 formed by the forward ends of the clip holder fingers 83a thereby causing the clip 25 to be firmly held by these fingers. Further forward movement of the clip applicator assembly 81 forces the clip into engagement with the branch rod 22 causing the clip to be secured about the branch rod to hold the lower end of the foil in position on the branch rod. The clip applicator assembly is then retracted to its rearmost position and a second clip 25 falls into place at the forward end of the clip holder in preparation for another cycle of operation of the clip applicator.

Forward and rearward movement of the clip applicator assembly is effected, in the illustrated embodiment of the present invention, by means of a double acting hydraulic cylinder 96 secured to the upper surface of the table 20 with the piston rod 97 of the cylinder having its forward end secured to the rear end of the clip applicator assembly 81, for example, by means of a coupling 98 as illustrated in FIG. 1. A solenoid actuated valve 99 is associated with the cylinder 96 to cause the piston rod 97 to be actuated forwardly and rearwardly as desired.

Prior to actuation of the clip applicator assembly in the forward direction to force a clip over the lowermost end of the branch rod 22 a locking bar 101 pivotally mounted beneath the knurled wheel 55, for example, by means of a pin 102 is actuated upwardly from the full line position as shown in FIG. 3 to the broken line position into engagement with the pivoted arm 62 which carries the guide block 61 to rigidly support the forward end of the pivoted arm 62 and hold the guide block in the desired position against the forward force exerted on the guide block during application of the clip 25 to the branch rod 22. The locking bar 101 is moved upwardly by the operator of the machine pressing an actuating lever 103 downwardly. The actuating lever is in the form of an L-shaped bell crank pivoted at its midpoint beneath the locking bar with the forward leg of the operating lever adapted to be gripped by the operator and the rearward leg of the operator interconnected with the locking bar by means of an adjustable link 104. A spring 105 interconnecting the rear leg of the operating lever 103 with the table 20 normally maintains the locking bar in its lowermost position out of engagement with the pivoted arm 62.

To operate the machine of the present invention the operator will initially place a branch rod 22 in the opening 64 of the guide block 61 and insert the forward end of the strip of foil into the slot at the forward end of the branch rod and twist the branch rod one or two turns to secure the foil to the branch rod. Thereafter, the operator will force the foot treadle 71 downwardly moving the branch rod into engagement with the continuously rotating knurled wheel 55 causing the rod to be rotated in advance and the foil wrapped about the rod. When the rod becomes disengaged from the knurled wheel it is held in position by spring-biased ball 68 as previously described. In order to secure the clip 25 to the rod 22 the operator will then force the operating lever 103 downwardly which causes the locking bar 101 to engage and support the arm 62. Further downward movement of the operating lever 103 after engagement of the arm 62 by the locking bar 101 will cause the rear leg of the operating bar 103 to engage and close a switch 106. This position of the operating lever 103 is shown in broken lines in FIG. 3. Upon closing the switch 106 an electric circuit is completed to the solenoid valve 99 admitting fluid under pressure to the rear end of the cylinder 96 and forcing the clip applicator assembly 81 forwardly thereby applying a clip to the branch rod. During movement of the clip applicator assembly to its forward position the operating lever will remain in its lowermost position with the locking bar in engagement with the arm 62. After the clip is applied to the branch rod 22 the operator of the machine will tear off the excess foil of the branch rod at a position immediately beneath the clip and will force a return lever 107 inwardly. Inward movement of the return lever 107 will open the circuit to the switch 106 actuating the solenoid valve 99 to a position where fluid is applied to the forward end of a piston 96 thereby retracting the clip applicator assembly 81 and permitting the operating lever to return to its upper position with the locking bar out of engagement with the arm 62. The operator will thereafter force a second rod 22 through the central opening of the guide block removing the finished branch rod from the guide block. This places the machine in position to start a second cycle of operation which may be initiated by the operator again depressing the foot treadle 71.

From the foregoing it will be observed that the present invention provides novel machine for automatically winding foil about the rods which may apply foil to rods of any length quickly and uniformly to form imitation Christmas tree branches or the like with the foil being firmly secured to the branch rod.

While a particular embodiment of the present invention has been illustrated and described herein it is not intended to limit the invention to such a disclosure and changes and modifications may be incorporated and embodied therein within the scope of the following claims.

I claim:

1. Apparatus for winding foil about a rod comprising; a support frame, foil guide means operable to guide said foil to a predetermined location relative to said support frame, a member carried by said support frame having a friction drive surface, drive means to cause movement of said member in a direction lengthwise of said friction drive surface, a rod guide block mounted adjacent said member for movement toward and away from said member, and means including an opening extending through said rod guide block operable to maintain said rod in a predetermined position relative to said member with said rod displaced from the axis of said member and disposed at an angle relative to said friction drive surface.

2. Apparatus for winding foil about a rod comprising; a support frame, foil guide means operable to guide said foil to a predetermined location relative to said support frame, a member carried by said support frame, having a friction drive surface, drive means to cause movement of said member in a direction lengthwise of said friction drive surface, a rod guide block mounted adjacent said member for movement toward and away from said member, means including an opening extending through said rod guide block operable to maintain said rod in a predetermined position relative to said member with said rod displaced from the axis of said member and disposed at an angle relative to said friction drive surface, and means to actuate said rod guide toward and away from said friction drive surface selectively to place said rod in engagement with said surface and remove said rod from engagement with said surface.

3. Apparatus for winding foil about a rod comprising; a support frame, foil guide means operable to guide said foil to a predetermined location relative to said support frame, a member carried by said support frame having a friction drive surface, drive means to cause movement of said member in a direction lengthwise of said friction drive surface, a rod guide block mounted adjacent said member for movement toward and operable to move away from said member, means including an opening extending through said rod guide block operable to maintain said rod in a predetermined position relative to said member with said rod displaced from the axis of said wheel and disposed at an angle relative to said friction drive surface, means to actuate said rod guide toward and away from said friction drive surface selectively to place said rod in engagement with said surface and remove said rod from engagement with said surface and a clip applicator carried by said support frame operable upon actuation to apply a clip to said rod to maintain foil on said rod.

4. Apparatus for winding foil about a rod comprising; a support frame, foil guide means operable to guide said foil to a predetermined location relative to said support frame, member carried by said support frame having a friction drive surface, drive means to cause movement of said member in a direction lengthwise of said friction drive surface, a rod guide block mounted adjacent said member for movement toward and away from said member, means including an opening extending through said rod guide block operable to maintain said rod in a predetermined position relative to said member with said rod displaced from the axis of said member and disposed at an angle relative to said friction drive surface, means to actuate said rod guide toward and away from said friction drive surface selectively to place said rod in engagement with said surface and remove said rod from engagement with said surface, a clip applicator carried by said support frame operable upon actuation to apply a clip to said rod to maintain foil on said rod, a locking bar carried by said support frame movable between predetermined opposite limit positions and operable in one limit position thereof to support and maintain said guide block stationary and in the other limit position thereof permit free movement of said guide block relative to said surface, and an actuator operable to move said locking bar to said one limit position and thereafter advance said clip applicator to apply a clip to said rod.

5. Apparatus for winding foil about a rod comprising; a support frame, means on said support frame to hold said foil, foil guide means operable to guide said foil to a predetermined location relative to said support frame, a foil tension unit positioned intermediate said foil support in said predetermined location operable to engage said foil and apply predetermined tension to said foil, an adhesive applicator intermediate said foil tension unit and said predetermined location operable to apply adhesive to one edge of said foil, a member carried by said support frame having a friction drive surface, drive means to cause movement of said member in a direction lengthwise of said friction drive surface, a rod guide block mounted adjacent said member for movement toward and away from said member, and means including an opening extending through said rod guide block operable to maintain said rod in a predetermined position relative to said member with said rod displaced from the axis of said member and disposed at an angle relative to said friction drive surface.

6. Apparatus for winding foil about a rod comprising; a support frame, means on said support frame to hold said foil, foil guide means operable to guide said foil to a predetermined location relative to said support frame, a foil tension unit positioned intermediate said foil support in said predetermined location operable to engage said foil and apply predetermined tension to said foil, an adhesive applicator intermediate said foil tension unit and said predetermined location operable to apply adhesive to one edge of said foil, a member carried by said support frame having a friction drive surface, drive means to cause movement of said member in a direction lengthwise of said friction drive surface, a rod guide block mounted adjacent said member for movement toward and away from said member, means including an opening extending through said rod guide block operable to maintain said rod in a predetermined position relative to said member with said rod displaced from the axis of said wheel and disposed at an angle relative to said friction drive surface, means to actuate said rod guide toward and away from said friction drive surface selectively to place said rod in engagement with said surface and remove said rod from engagement with said surface, a clip applicator carried by said support frame operable upon actuation to apply a clip to said rod to maintain foil on said rod, a locking bar carried by said support frame movable between predetermined opposite limit positions and operable in one limit position thereof to support and maintain said guide block stationary and in the other limit position thereof permit free movement of said guide block relative to said surface, and an actuator operable to move said locking bar to said one limit position and thereafter advance said clip applicator to apply a clip to said rod.

7. Apparatus for winding foil about a rod comprising; a support frame, foil guide means operable to guide said foil to a predetermined location relative to said support frame, a knurled wheel carried by said support frame, drive means to rotate said knurled wheel about its axis, a rod guide block mounted adjacent said wheel for movement toward and away from said wheel, and means including an opening extending through said rod guide block operable to maintain said rod in a predetermined position relative to said wheel with said rod displaced from the axis said wheel and disposed at an angle relative to the axis of said wheel.

8. Apparatus for winding foil about a rod comprising; a support frame, foil guide means operable to guide said foil to a predetermined location relative to said support frame, a knurled wheel carried by said support frame, drive means to rotate said knurled wheel continuously about its axis, a rod guide block mounted adjacent said wheel for movement toward and away from said wheel, means including an opening extending through said rod guide block operable to maintain said rod in a predetermined position relative to said wheel with said rod displaced from the axis of said wheel and disposed at an angle relative to the axis of said wheel, and means to actuate said rod guide toward and away from said wheel in a direction substantially radially of said wheel selectively to place said rod in engagement with the peripheral surface of said wheel and remove said rod from engagement with said wheel.

9. Apparatus for winding foil about a rod comprising; a support frame, means on said support frame to hold said foil, foil guide means operable to guide said foil to a predetermined location relative to said support frame, a foil tension unit positioned intermediate said foil support in said predetermined location operable to engage said foil and apply predetermined tension to said foil, an adhesive applicator intermediate said foil tension unit and said predetermined location operable to apply adhesive to one edge of said foil, a knurled wheel carried by said support frame, drive means to rotate said knurled wheel continuously about its axis, a rod guide block mounted adjacent said wheel for movement toward and away from said wheel, and means including an opening extending through said rod guide block operable to maintain said rod in a predetermined position relative to said wheel with said rod displaced from the axis of said wheel and disposed at an angle relative to the axis of said wheel.

10. Apparatus for winding foil about a rod comprising; a support frame, means on said support frame to hold said foil, foil guide means operable to guide said foil to a predetermined location relative to said support frame, a foil tension unit positioned intermediate said foil support in said predetermined location operable to engage said foil and apply predetermined tension to said foil, an adhesive applicator intermediate said foil tension unit and said predetermined location operable to apply adhesive to one edge of said foil, a knurled wheel carried by said support frame, drive means to rotate said knurled wheel continuously about its axis, a rod guide block mounted adjacent said wheel for movement toward and away from said wheel, means including an opening extending through said rod guide block operable to maintain said rod in a predetermined position relative to said wheel with said rod displaced from the axis of said wheel and disposed at an angle relative to the axis of said wheel, means to actuate said rod guide toward and away from said wheel selectively to place said rod in engagement with the peripheral surface of said wheel and remove said rod from engagement with said wheel, a clip applicator carried by said support frame operable upon actuation to apply a clip to said rod to maintain foil on said rod, a locking bar carried by said support frame movable between predetermined opposite limit positions and operable in one limit position thereof to support and maintain said guide block stationary and in the other limit position thereof permit free movement of said guide block relative to said wheel, and an actuator operable to move said locking bar to said one limit position and thereafter advance said clip applicator to apply a clip to said rod.

11. In apparatus for wrapping foil spirally about a rod, the combination including; a continuously rotating wheel, a guide block mounted for movement toward and away from said wheel, means defining an opening in said guide block to support and guide a rod and maintain a rod in a predetermined relation relative to said wheel spaced from the axis of said wheel disposed at an angle relative to the axis of said wheel, means defining a groove in one side of guide block at right angles to the axis of said wheel and intersecting the opening in said guide block, and mounting means for said guide block mounting said guide block for relative movement toward and away from said wheel operable upon movement toward said wheel to cause said wheel to enter said groove and engage said rod.

12. In apparatus for wrapping foil spirally about a rod, the combination including; a continuously rotating wheel, a guide block mounted for movement toward and away from said wheel, means defining an opening in said guide block to support and guide a rod and maintain a rod in a predetermined relation relative to said wheel spaced from the axis of said wheel disposed at an angle relative to the axis of said wheel, means defining a groove in one side of said guide block at right angles to the axis of said wheel and intersecting the opening in said guide block, mounting means for said guide block mounting said guide block for relative movement toward and away from said wheel and operable upon movement toward said wheel to cause said wheel to enter said groove and engage said rod, and a spring biased member carried by said guide block in engagement with said rod in said guide block operable to maintain said rod in position in said guide block.

References Cited in the file of this patent
UNITED STATES PATENTS

| | | |
|---|---|---|
| 1,958,092 | Merrill | May 8, 1934 |
| 2,074,892 | Derry | Mar. 23, 1937 |
| 2,253,069 | Eckel et al. | Aug. 19, 1941 |
| 2,377,608 | Bronson | June 5, 1945 |
| 2,389,725 | Gillis et al. | Nov. 27, 1945 |
| 2,540,549 | Rotter | Feb. 6, 1951 |
| 2,648,879 | Patterson | Aug. 18, 1953 |
| 2,733,753 | Schlesselman et al. | Feb. 7, 1956 |
| 2,826,238 | Schmidt | Mar. 11, 1958 |
| 2,889,650 | Hankus | June 9, 1959 |
| 3,056,223 | Crane | Oct. 2, 1962 |
| 3,099,190 | Allen et al. | July 30, 1963 |